(12) United States Patent
Tanaka

(10) Patent No.: US 7,808,876 B2
(45) Date of Patent: Oct. 5, 2010

(54) HOLOGRAM RECORDING/RECONSTRUCTING APPARATUS

(75) Inventor: Tomiji Tanaka, Saitama (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 12/143,167

(22) Filed: Jun. 20, 2008

(65) Prior Publication Data
US 2009/0034397 A1 Feb. 5, 2009

(30) Foreign Application Priority Data
Aug. 1, 2007 (JP) ............................. 2007-200543

(51) Int. Cl.
*G11B 7/00* (2006.01)
(52) U.S. Cl. ............. 369/103; 369/112.01; 369/124.04; 369/107
(58) Field of Classification Search ........................ None
See application file for complete search history.

(56) References Cited

U.S. PATENT DOCUMENTS

| 2005/0122549 A1* | 6/2005 | Goulanian et al. ............. 359/3 |
| 2006/0007512 A1 | 1/2006 | Kanesaka et al. |
| 2006/0232841 A1 | 10/2006 | Toishi et al. |
| 2007/0146836 A1 | 6/2007 | Fukushima et al. |
| 2007/0206478 A1* | 9/2007 | Uchida et al. ............... 369/103 |

FOREIGN PATENT DOCUMENTS

JP  11-242424  9/1999

OTHER PUBLICATIONS

Mitsuru Toishi, et al., "Improvement in Temperature Tolerance of Holographic Data Storage Using Wavelength Tunable Laser", Japanese Journal of Applied Physics, vol. 45, No. 2B, XP002436480, Feb. 1, 2006, pp. 1297-1304.
Mitsuru Toishi, et al., "Evaluation of Polycarbonate Substrate Hologram Recording Medium Regarding Implication of Birefringence and Thermal Expansion", Optics Communications, vol. 270, No. 1, XP005730454, 2007, pp. 17-24.
Nikkei Electronics, Guest Paper, Jan. 17, 2005, pp. 105-114.
Tsutomu Shimura, et al. "Analysis of a collinear holographic storage system: introduction of pixel spread function", Optics Letters, vol. 31, No. 9, May 1, 2006, pp. 1208-1210.

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

A hologram recording/reconstructing apparatus includes a spatial modulator in which a reference beam region and a reconstruction beam region are formed, and a controller configured to control a range of the reference beam region and a range of the reconstruction beam region. According to a temperature of a hologram recording medium during recording, the controller sets the range of the reference beam region to a first predetermined range and thereby sets a range of an incident angle of a reference beam on the hologram recording medium to a first predetermined angle range. According to a temperature of the hologram recording medium during reconstruction of recorded data, the controller sets the range of the reconstruction beam region to a second predetermined range and thereby sets a range of an incident angle of a reconstruction beam on the hologram recording medium to a second predetermined angle range.

9 Claims, 10 Drawing Sheets

FIG. 13
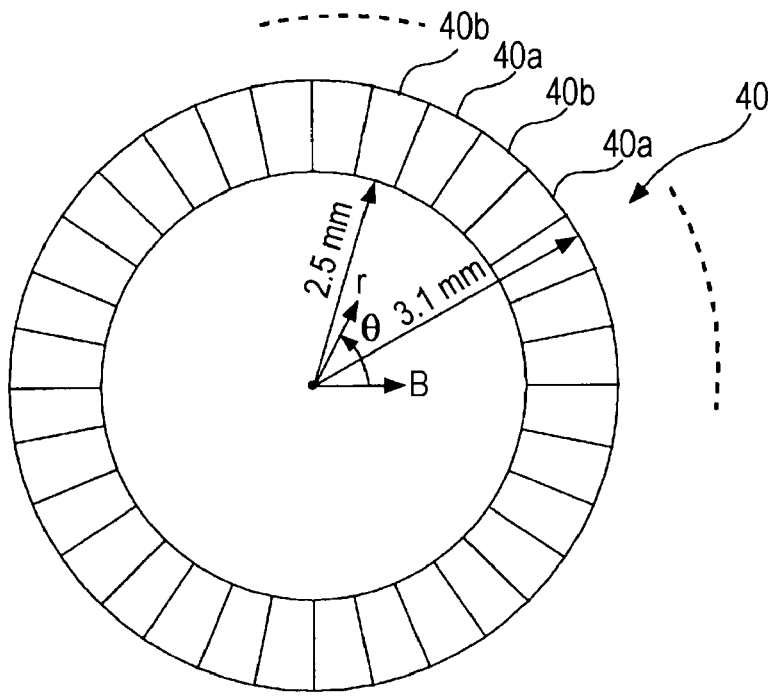
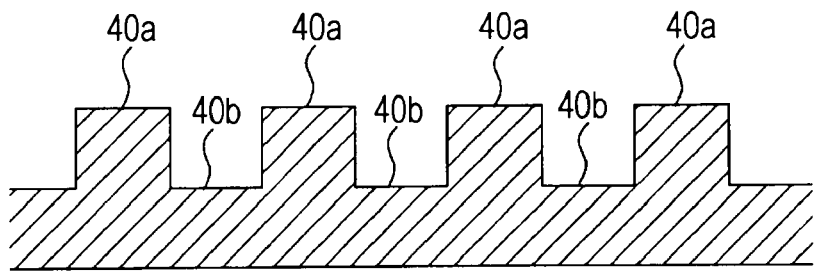
FIG. 14A
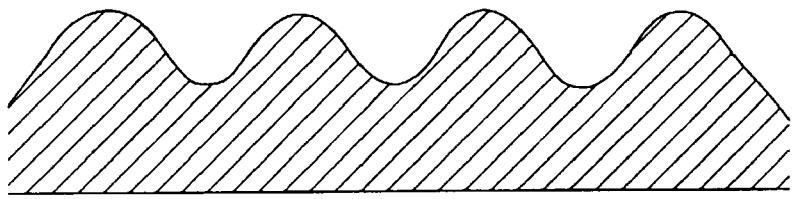
FIG. 14B
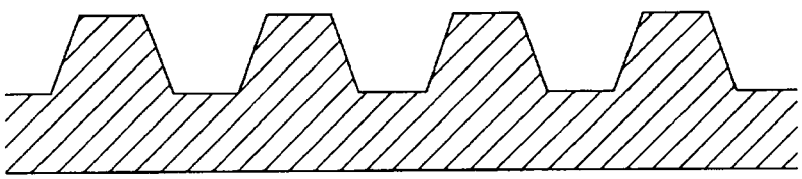
FIG. 14C

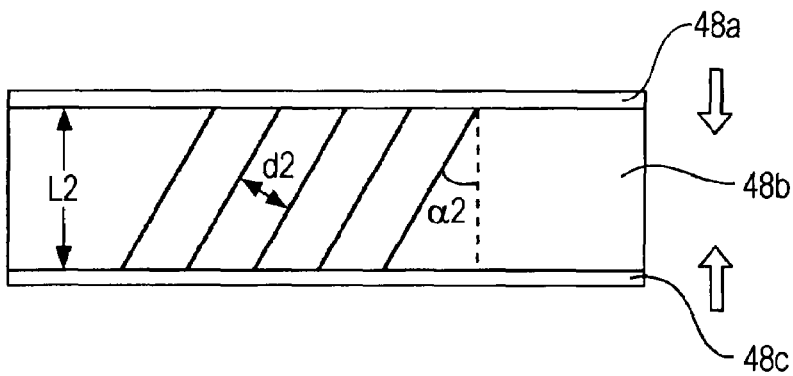
FIG. 17A 15°C
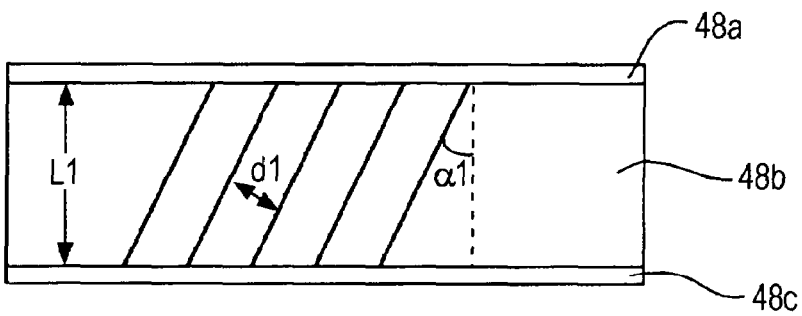
FIG. 17B 25°C
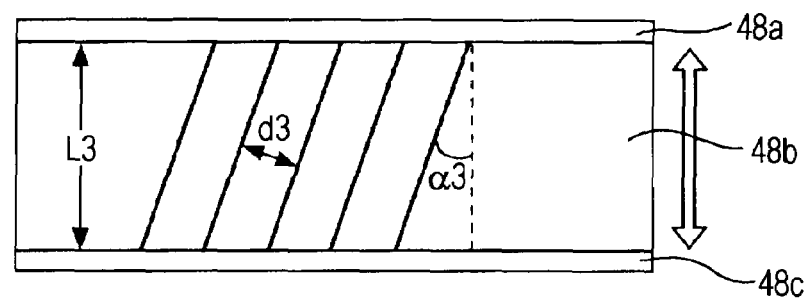
FIG. 17C 35°C
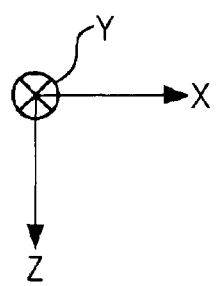

HOLOGRAM RECORDING/RECONSTRUCTING APPARATUS

CROSS REFERENCES TO RELATED APPLICATIONS

The present invention contains subject matter related to Japanese Patent Application JP 2007-200543 filed in the Japanese Patent Office on Aug. 1, 2007, the entire contents of which are incorporated herein by reference.

BACKGROUND OF THE INVENTION

1. Field of the Invention

The present invention relates to hologram recording apparatuses and/or hologram reconstructing apparatuses.

2. Description of the Related Art

A hologram memory, serving as a data storage device, has been a focus of attention in recent years. In the hologram memory, a hologram recording apparatus is used to record a hologram, while a hologram reconstructing apparatus is used to reconstruct the recorded hologram. Hologram recording is performed as follows. That is, a signal beam modulated according to data to be recorded and a predetermined reference beam are generated from laser light emitted from the same light source and applied to a hologram recording medium, in which the signal beam and the reference beam interfere with each other to form an interference pattern (hologram). Thus, the data is recorded on the hologram recording medium as a hologram. The recorded hologram contains a large amount of information recorded in a unit called a page. The recorded data is identified and managed on a page-by-page basis.

In this hologram memory, the hologram reconstructing apparatus is used to reconstruct the recorded data from the hologram recording medium. Hologram reconstruction is performed as follows. That is, a reconstruction beam that is a light beam having characteristics identical to those of the reference beam used in recording is applied to the hologram formed according to the data described above. This causes a diffracted beam to emerge from the hologram recording medium. The diffracted beam, which contains a page of recorded data, is detected by a two-dimensional array of photodetectors and subjected to signal processing. Thus the recorded data can be reconstructed.

Besides, there has been proposed a hologram recording/reconstructing apparatus (recording and reconstructing apparatus) that is capable of performing the functions of both the hologram recording apparatus and the hologram reconstructing apparatus. In the following description, the term "hologram recording/reconstructing apparatus (recording and/or reconstructing apparatus)" is used to collectively refer to a hologram recording apparatus, a hologram reconstructing apparatus, and a hologram recording/reconstructing apparatus, and if a clear distinction is needed, it will be described accordingly. Similarly, the term "recording/reconstruction (recording and/or reconstruction)" is used to collectively refer to recording, reconstruction, and recording/reconstruction (recording and reconstruction), and if a clear distinction is needed, it will be described accordingly.

Generation of the signal beam, reference beam, and reconstruction beam and detection of the diffracted beam are performed in a hologram recording/reconstructing optical section formed by combining optical elements. Examples of methods for designing an optical path in the optical section include a so-called coaxial method (see, e.g., Nikkei Electronics, Jan. 17, 2005, pp. 106 to 114) in which the signal beam and the reference beam are coaxially arranged, the paths of the reference beam and reconstruction beam partially overlap, and these optical beams (signal beam, reference beam, and reconstruction beam) pass through a common optical path. Another method for designing an optical path in the optical section is a two-beam method in which the signal beam and the reference beam (reconstruction beam) pass through different optical paths.

In the hologram memory, if a temperature during recording and a temperature during reconstruction are different from each other by several ° C., it is difficult to reconstruct the recorded data due to thermal expansion or contraction of the hologram recording medium. FIG. 17A to FIG. 17C schematically illustrate thermal expansion and contraction of a hologram recording medium. Specifically, FIG. 17A to FIG. 17C each illustrate a hologram corresponding to a given temperature of the hologram recording medium. For ease of explanation, only a substrate 48a, a recording material layer 48b, and a substrate 48c of the hologram recording medium are shown, and the illustration of a reflective film and the like is omitted. As illustrated, the recording material layer 48b is interposed between the substrate 48a and the substrate 48c. In the following description, the term "thermal expansion" is used in a broader sense and includes thermal contraction, but both the terms "thermal expansion" and "thermal contraction" will be used if a clear distinction therebetween is necessary.

When the temperature changes, the hologram recording medium is thermally expanded in a Z-direction (see the lower left part of FIG. 17C) under the influence of a thermal expansion coefficient of the recording material layer 48b (typically about $5 \times 10^{-4}/°$ C.). In an X-direction and a Y-direction (see the lower left part of FIG. 17C), the intervals and directions of recorded interference fringes of the hologram are changed by pressure from the substrates 48a and 48c which are hard and have a small thermal expansion coefficient (about $7 \times 10^{-6}/°$ C. to $8 \times 10^{-6}/°$ C.). FIG. 17B schematically illustrates a state of a hologram when the temperature of the hologram recording medium is 25° C. (reference temperature). In FIG. 17B, L1 denotes a thickness of the recording material layer 48b, d1 denotes a distance between adjacent fringes, and α1 denotes an inclination of fringes with respect a surface of the hologram recording medium.

If the temperature of the hologram recording medium becomes 15° C., the hologram recorded at a temperature of 25° C. (reference temperature) is changed to the state illustrated in FIG. 17A. In FIG. 17A, L2 denotes a thickness of the recording material layer 48b, d2 denotes a distance between adjacent fringes, and α2 denotes an inclination of fringes with respect a surface of the hologram recording medium. Due to thermal contraction of the recording material layer 48b, the thickness L2 becomes smaller than the thickness L1, the distance d2 becomes smaller than the distance d1, and the inclination α2 becomes greater than the inclination α1. If the temperature of the hologram recording medium becomes 35° C., the hologram recorded at a temperature of 25° C. (reference temperature) is changed to the state illustrated in FIG. 17C. In FIG. 17C, L3 denotes a thickness of the recording material layer 48b, d3 denotes a distance between adjacent fringes, and α3 denotes an inclination of fringes with respect a surface of the hologram recording medium. Due to thermal expansion of the recording material layer 48b, the thickness L3 becomes greater than the thickness L1, the distance d3 becomes greater than the distance d1, and the inclination α3 becomes smaller than the inclination α1.

As described above, if there is a difference between the temperature of the hologram recording medium during recording and that during reconstruction, the shape of the hologram is changed accordingly. As a result, when a light beam having the same wavelength and incident direction as those of the reference beam used during recording is used as a reconstruction beam for obtaining a diffracted beam from the hologram recording medium to reconstruct the recorded data, since a Bragg condition of interference fringes is not satisfied and no diffracted beam is generated, it is difficult to reconstruct the recorded data from the diffracted beam. To solve this, the inventor listed in the present application proposed a method for changing the wavelength and incident direction of the reconstruction beam from those of the reference beam, and also proposed a tunable (wavelength variable) laser for varying the wavelength (see, e.g., T. Tanaka, K. Sako, R. Kasegawa, M. Toishi, K. Watanabe, and S. Akao, "Tunable blue laser for holographic data storage" Proceedings of Optical Data Storage, 2006, pp. 215 to 217). As for the incident direction, it is easy, with the two-beam method described above, to change the incident direction of either of the reconstruction beam and the reference beam.

SUMMARY OF THE INVENTION

However, with the coaxial method, where the signal beam and the reference beam share the same optical path, it was difficult to make the incident direction of the reconstruction beam different from that of the reference beam. Accordingly, it is desirable to provide a recording and/or reconstructing technique in which the incident directions of the reference and reconstruction beams can be made different from each other and thus good recording and/or reconstruction characteristics can be obtained.

A hologram recording/reconstructing apparatus according to an embodiment of the present invention illuminates a hologram recording medium with a signal beam and a reference beam to record data thereon as a hologram, illuminates the hologram recorded on the hologram recording medium with a reconstruction beam to obtain a diffracted beam, and reconstructs the recorded data from the diffracted beam. The hologram recording/reconstructing apparatus includes a spatial modulator in which a reference beam region for generating the reference beam and a reconstruction beam region for generating the reconstruction beam are formed, and a controller configured to control a range of the reference beam region and a range of the reconstruction beam region. According to a temperature of the hologram recording medium during recording, the range of the reference beam region is set to a first predetermined range and thereby a range of an incident angle of the reference beam on the hologram recording medium is set to a first predetermined angle range. According to a temperature of the hologram recording medium during reconstruction of the recorded data, the range of the reconstruction beam region is set to a second predetermined range and thereby a range of an incident angle of the reconstruction beam on the hologram recording medium is set to a second predetermined angle range.

A hologram recording/reconstructing apparatus according to an embodiment of the present invention illuminates a hologram recording medium with a signal beam and a reference beam to record data thereon as a hologram. Additionally, the hologram recording/reconstructing apparatus illuminates the hologram recorded on the hologram recording medium with a reconstruction beam to obtain a diffracted beam, and thus reconstructs the recorded data from the diffracted beam. The hologram recording/reconstructing apparatus includes a spatial modulator and a controller configured to control ranges of a reference beam region and a reconstruction beam in the spatial modulator. For recording on the hologram recording medium, according to a temperature of the hologram recording medium during recording, the range of the reference beam region is set to a first predetermined range and thereby a range of an incident angle of the reference beam on the hologram recording medium is set to a first predetermined angle range. For reconstruction from the hologram recording medium, according to a temperature of the hologram recording medium during reconstruction, the range of the reconstruction beam region is set to a second predetermined range and thereby a range of an incident angle of the reconstruction beam on the hologram recording medium is set to a second predetermined angle range. Here, the second predetermined angle range is an incident angle range that most satisfies a Bragg condition (i.e., an optimum range of the incident angle of the reconstruction beam). Thus, even when the shape of the hologram formed on the hologram recording medium changes according to the temperature of the hologram recording medium, good recording/reconstruction characteristics can be obtained by appropriately varying the incident angles of the reference and reconstruction beams according to the change in the shape of the hologram. That is, even when the temperatures of the hologram recording medium during recording and reconstruction differ from each other, it is possible to achieve good recording/reconstruction characteristics.

A hologram recording/reconstructing apparatus according to another embodiment of the present invention illuminates a hologram recording medium with a signal beam and a reference beam to record data thereon as a hologram, illuminates the hologram recorded on the hologram recording medium with a reconstruction beam to obtain a diffracted beam, and reconstructs the recorded data from the diffracted beam. The hologram recording/reconstructing apparatus includes a spatial modulator in which a reference beam region for generating the reference beam and a reconstruction beam region for generating the reconstruction beam are formed, and a controller configured to control a range of the reference beam region and a range of the reconstruction beam region. The range of the reference beam region is set to a predetermined range and thereby a range of an incident angle of the reference beam on the hologram recording medium is set to a predetermined angle range. The range of the reconstruction beam region is set such that a range of an incident angle of the reconstruction beam includes the predetermined angle range of the reference beam during recording on the hologram recording medium.

A hologram recording/reconstructing apparatus according to another embodiment of the present invention illuminates a hologram recording medium with a signal beam and a reference beam to record data thereon as a hologram. Additionally, the hologram recording/reconstructing apparatus illuminates the hologram recorded on the hologram recording medium with a reconstruction beam to obtain a diffracted beam, and thus reconstructs the recorded data from the diffracted beam. The hologram recording/reconstructing apparatus includes a spatial modulator and a controller configured to control ranges of a reference beam region and a reconstruction beam region in the spatial modulator. For recording on the hologram recording medium, according to a temperature of the hologram recording medium during recording, the range of the reference beam region is set to a predetermined range and thereby a range of an incident angle of the reference beam on the hologram recording medium is set to a predetermined angle range. For reconstruction from the hologram recording medium, the range of the reconstruction beam region is set such that an incident angle of the reconstruction beam at any temperature within an operating temperature range of the hologram recording/reconstructing apparatus includes the predetermined angle range of the reference beam during recording on the hologram recording medium. As a result, regardless of whether the shape of the hologram has been changed according to the temperature of the hologram recording medium, the incident angle range of the reconstruction beam can include the incident angle range of the reference beam that illuminates the hologram. That is, a hologram formed from a reference beam and a signal beam is illuminated with both a reconstruction beam having an appropriate incident angle and a reconstruction beam having an incident angle that does not contribute to reconstruction. Then, by using the fact that only a reconstruction beam having an appropriate incident angle range satisfies a Bragg condition and allows a diffracted beam to be generated, it is possible to achieve good recording/reconstruction characteristics even when temperatures of the hologram recording medium during recording and reconstruction differ from each other.

A hologram recording apparatus according to an embodiment of the present invention illuminates a hologram recording medium with a signal beam and a reference beam to record data thereon as a hologram. The hologram recording apparatus includes a spatial modulator in which a reference beam region for generating the reference beam is formed, and a controller configured to control a range of the reference beam region. For recording on the hologram recording medium, according to a temperature of the hologram recording medium during recording, the range of the reference beam region is set to a predetermined range and thereby a range of an incident angle of the reference beam on the hologram recording medium is set to a predetermined angle range.

A hologram recording apparatus according to an embodiment of the present invention illuminates a hologram recording medium with a signal beam and a reference beam to record data thereon as a hologram. The hologram recording apparatus includes a spatial modulator and a controller configured to control a range of a reference beam region in the spatial modulator. For recording on the hologram recording medium, according to a temperature of the hologram recording medium during recording, the range of the reference beam region is set to a predetermined range and thereby a range of an incident angle of the reference beam on the hologram recording medium is set to a predetermined angle range. Thus, recording on the hologram recording medium is completed. Then, when reconstruction is performed by illuminating the recorded hologram with a reconstruction beam, an appropriate incident angle of the reconstruction beam can be found. Therefore, even when temperatures of the hologram recording medium during recording and reconstruction differ from each other, it is possible to achieve good recording/reconstruction characteristics.

A hologram reconstructing apparatus according to an embodiment of the present invention illuminates, with a reconstruction beam, a hologram recording medium on which data is recorded as a hologram by illuminating the hologram recording medium with a signal beam and a reference beam having a first predetermined angle range corresponding to a temperature of the hologram recording medium during recording, obtains a diffracted beam, and reconstructs the recorded data from the diffracted beam. The hologram recording/reconstructing apparatus includes a spatial modulator in which a reconstruction beam region for generating the reconstruction beam is formed, and a controller configured to control a range of the reconstruction beam region. According to a temperature of the hologram recording medium during reconstruction of the recorded data, the range of the reconstruction beam region is set to a predetermined range and thereby a range of an incident angle of the reconstruction beam on the hologram recording medium is set to a second predetermined angle range.

A hologram recording medium on which reconstruction is to be performed by a hologram reconstructing apparatus according to an embodiment of the present invention is one on which data is recorded as a hologram by illuminating the hologram recording medium with a signal beam and a reference beam having a first predetermined angle range corresponding to a temperature of the hologram recording medium during recording. That is, recording on the hologram recording medium is performed such that, by setting an incident angle range of the reference beam to the first predetermined angle range, even when the shape of the hologram changes according to the temperature of the hologram recording medium, the change in the shape of the hologram and an optimum incident angle range of the reconstruction beam are predictable. The hologram reconstructing apparatus includes a spatial modulator and a controller configured to control a range of a reconstruction beam region in the spatial modulator. Then, according to a temperature of the hologram recording medium during reconstruction, the range of the reconstruction beam region is set to a predetermined range and thereby a range of an incident angle of the reconstruction beam on the hologram recording medium is set to a second predetermined angle range. Here, the second predetermined angle range is an incident angle range that most satisfies a Bragg condition (i.e., an optimum range of the incident angle of the reconstruction beam). Thus, even when the temperature of the hologram recording medium changes after recording of the hologram and the shape of the hologram changes, an appropriate incident angle range of the reconstruction beam can be found. By using the reconstruction beam having the appropriate incident angle range, even when temperatures of the hologram recording medium during recording and reconstruction differ from each other, it is possible to achieve good recording/reconstruction characteristics.

A hologram reconstructing apparatus according to another embodiment of the present invention illuminates, with a reconstruction beam, a hologram recording medium on which data is recorded as a hologram by illuminating the hologram recording medium with a signal beam and a reference beam, obtains a diffracted beam, and reconstructs the recorded data from the diffracted beam. The hologram reconstructing apparatus includes a spatial modulator in which a reconstruction beam region for generating the reconstruction beam is formed, and a controller configured to control a range of the reconstruction beam region. The range of the reconstruction beam region is set such that a range of an incident angle of the reconstruction beam includes a range of an incident angle of the reference beam during recording of the hologram on the hologram recording medium.

For reconstruction of a hologram from a hologram recording medium, a hologram reconstructing apparatus according to another embodiment of the present invention controls a range of a reconstruction beam region such that an incident angle range of a reconstruction beam includes a predetermined angle range of a reference beam during recording of the hologram on the hologram recording medium. As a result, regardless of whether the shape of the hologram has been changed according to a temperature of the hologram recording medium, the incident angle range of the reconstruction beam can include the incident angle range of the reference beam that illuminates the hologram. That is, the hologram is illuminated with both a reconstruction beam having an appropriate incident angle and a reconstruction beam having an incident angle that does not contribute to reconstruction. Then, only the reconstruction beam having an appropriate incident angle satisfies a Bragg condition and allows a diffracted beam to be generated. Thus, even when temperatures of the hologram recording medium during recording and reconstruction differ from each other and the shape of the hologram changes according to the temperature of the hologram recording medium, it is possible to achieve good recording/reconstruction characteristics.

According to an embodiment of the present invention, it is possible to achieve good recording and/or reconstruction characteristics by making incident angle ranges of a reference beam and a reconstruction beam different from each other.

BRIEF DESCRIPTION OF THE DRAWINGS

FIG. 13 is a plan view illustrating a radial phase mask as an example of a phase mask.

FIG. 14A to FIG. 14C are profiles of various types of phase masks.

FIG. 17A to FIG. 17C schematically illustrate thermal expansion and contraction of the hologram recording medium.

Figure 1:
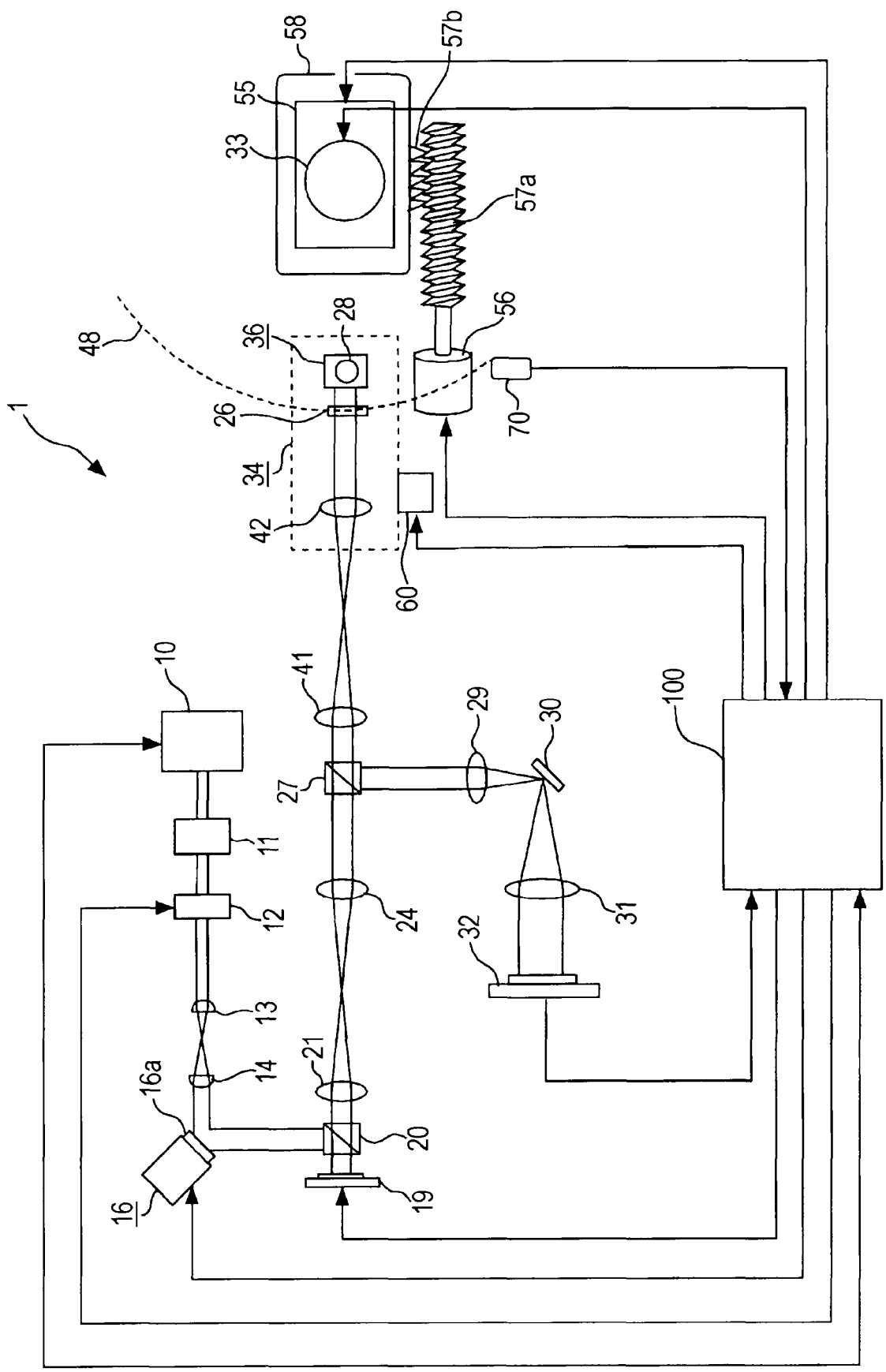
FIG. 1 is a schematic view primarily illustrating an optical section of a hologram recording/reconstructing apparatus according to an embodiment of the present invention.

DESCRIPTION OF THE PREFERRED EMBODIMENTS (Overview of Recording and Reconstruction Principles of Embodiments)

A coaxial method is used to perform recording and reconstruction of a hologram according to an embodiment of the present invention. By illuminating a hologram recording medium with a signal beam and a reference beam, data is recorded on the hologram recording medium as a hologram. A hologram recording apparatus and/or a hologram reconstructing apparatus of the embodiment include/includes a spatial modulator and a controller configured to control a range of a reference beam region and/or a range of a reconstruction beam region in the spatial modulator. For recording on the hologram recording medium, according to a temperature of the hologram recording medium during recording, the range of the reference beam region is set to a predetermined range (first predetermined range) and thereby a range of an incident angle of the reference beam on the hologram recording medium is set to a predetermined angle range (first predetermined angle range). Thus, recording on the hologram recording medium is completed. To associate the temperature of the hologram recording medium with the range (first predetermined range) of the reference beam region, an equation may be used or a relationship between the temperature of the hologram recording medium and the first predetermined range may be mapped and stored in a random-access memory (RAM) or the like. When an equation is used, the controller performs calculation in which the temperature is input and the range of the reference beam region is output. When mapping is performed, the temperature is used as address space into which data corresponding to the range of the reference beam region is mapped.

If the hologram is recorded as described above, it is possible to uniquely determine how the shape of the hologram is to be changed according to the temperature of the hologram recording medium. Here, typical parameters representing changes in the shape of the hologram are a tilt angle of the hologram and a distance between fringes of a hologram grating. A tilt angle of a hologram is closely related to an incident angle that is an angle of a light beam incident on the hologram. An incident angle of the light beam for obtaining an optimum diffracted beam from the hologram is determined from the shape of the hologram. Moreover, since the hologram is formed three-dimensionally, an optimum incident angle range (second predetermined angle range) of the reconstruction beam for each temperature is also uniquely determined. Here, the optimum incident angle range of the reconstruction beam means an incident angle range that most satisfies a Bragg condition. If the Bragg condition is not satisfied, the amount of light of a diffracted beam is reduced. Therefore, by illuminating the hologram with a reconstruction beam having the optimum incident angle range, most preferable reconstruction characteristics can be achieved, and most preferable recording/reconstruction characteristics including both recording and reconstruction characteristics can be achieved.

To obtain a reconstruction beam having an optimum incident angle range, it is necessary to provide a configuration for varying an incident angle range of the reference beam. With the coaxial method, it was difficult in the related art to realize such a configuration. However, according to an embodiment of the present invention, it is possible to easily change the incident angle range of the reconstruction beam by varying the range of the reconstruction beam region formed in the spatial modulator. The same is applicable to the reference beam during recording. That is, the reference beam having the predetermined angle range (first predetermined angle range) can be obtained by forming the reference beam region in the predetermined range (first predetermined range) of the spatial modulator, while the reconstruction beam having the predetermined angle range (second predetermined angle range) can be obtained by forming the reconstruction beam region in the predetermined range (second predetermined range) of the spatial modulator.

A distance between fringes of the hologram grating is closely related to a wavelength of a light beam incident on the hologram. A wavelength of the light beam for obtaining an optimum diffracted beam from the hologram is determined from the shape of the hologram. Therefore, if a reference beam having a predetermined wavelength is used to record a hologram, it is possible to uniquely determine the most appropriate wavelength of a reconstruction beam for illuminating the recorded hologram to obtain a diffracted beam. That is, by selecting an appropriate wavelength of the reconstruction beam as well as setting an appropriate incident angle of the reconstruction beam as described above, more preferable reconstruction characteristics and more preferable recording/reconstruction characteristics can be achieved. To associate the temperature of the hologram recording medium with the wavelength, an equation may be used or a relationship between the temperature and the wavelength may be mapped and stored in a RAM or the like.

If a phase mask through which a reference beam passes is further provided, it is possible to prevent so-call zero-order light from concentrating on a specific point on the hologram recording medium. Here, the phase mask needs to be used during reconstruction, as well as during recording, to achieve good recording/reconstruction characteristics. If the temperature of the hologram recording medium during reconstruction is the same as that during recording, it is only necessary to use the same phase mask during recording and reconstruction, and there is no specific constraints on the configuration of the phase mask. However, when the phase mask is used in the present embodiment, if the range of the reference beam region and the range of the reconstruction beam region differ from each other, some consideration is necessary to configure the phase mask. That is, the phase mask needs to be configured such that it gives the same phase characteristics to light beams that illuminate the same point on the hologram. As described above, the same point on the hologram (i.e., any point in a three-dimensional space of the hologram) moves according to the temperature. Therefore, even when temperatures during recording and reconstruction differ from each other, the reference beam obtained through the phase mask and the reconstruction beam obtained through the phase mask need to have the same effect on the same point on the hologram.

For example, if the reference beam region and the reconstruction beam region are doughnut-shaped regions having the same center, a phase mask that allows the reference beam and the reconstruction beam to have the same effect on the same point can be configured as follows. That is, the phase mask can be formed to have uniform phase characteristics along a radial line passing thorough a center thereof corresponding to the same center of the reference beam region and the reconstruction beam region (i.e., the same center of the outer and inner circles defining the doughnut-shaped regions). More specifically, for example, the phase mask has a simple configuration in which its phase changes only circumferentially and not radially.

In the present embodiment, an appropriate incident angle range of the reference beam is defined according to the temperature of the hologram recording medium, and an appropriate incident angle range of the reconstruction beam is defined according to the temperature of the hologram recording medium. In another embodiment of the present invention, during recording, an incident angle range of the reference beam is set to a predetermined fixed range or an incident angle range corresponding to the temperature of the hologram recording medium during recording; while during reconstruction, an incident angle range of the reconstruction beam is set to be greater than that of the reference beam. Thus, without regard to the temperature of the hologram recording medium or at least without regard to the temperature of the hologram recording medium during reconstruction, good reconstruction characteristics and recording/reconstruction characteristics can be achieved. Although an excess reconstruction beam is generated in this case, this excess reconstruction beam does not satisfy a Bragg condition and thus does not cause any serious problem in obtaining a diffracted beam.

The foregoing principles of recording and reconstruction are applicable to a hologram recording apparatus, a hologram reconstructing apparatus, and a hologram recording/reconstructing apparatus. Hereinafter, the foregoing principles of recording and reconstruction will be described in detail with reference to the drawings.

(Hologram Recording/Reconstructing Apparatus of Embodiments)

FIG. 1 is a schematic view primarily illustrating an optical section serving as a major part of a hologram recording/reconstructing apparatus that performs recording and reconstruction using a hologram recording medium. The hologram recording/reconstructing apparatus illustrated in FIG. 1 is an apparatus that performs recording and/or reconstruction and uses the coaxial method.

A hologram recording medium 48 used in a hologram recording/reconstructing apparatus 1 of FIG. 1 is a disk-shaped medium, like a compact disk (CD) or a digital versatile disk (DVD). A hole for positioning the rotational center of the hologram recording medium 48 is provided at the innermost part of the hologram recording medium 48. The hologram recording/reconstructing apparatus 1 that performs a recording/reconstructing operation on the hologram recording medium 48 includes the optical section illustrated in FIG. 1 as a major constituent. Additionally, the hologram recording/reconstructing apparatus 1 includes a controller 100 having an electric circuit (not illustrated in detail) and a mechanical section, which is partially illustrated in FIG. 1. The hologram recording/reconstructing apparatus 1 is connected via the controller 100 to external devices (not shown), such as a host computer and a video display device (monitor). Like the hologram recording medium illustrated in FIG. 17A to FIG. 17C as related art, the hologram recording medium 48 includes a recording material layer 48b, a substrate 48a, and a substrate 48c. For the hologram recording/reconstructing apparatus 1 to use the coaxial method, the hologram recording medium 48 further includes a reflective film (not shown) for reflecting, back to the optical section, a diffracted beam having emerged in response to a reconstruction beam.

The optical section of the hologram recording/reconstructing apparatus 1 forms an optical path through which a light beam passes. The optical section includes a laser source 10, an isolator 11, a shutter 12, a Fourier transform lens 13, a Fourier transform lens 14, a movable mirror 16a, a spatial modulator 19, a polarization beam splitter 20, a Fourier transform lens 21, a Fourier transform lens 24, a polarization beam splitter 27, a Fourier transform lens 41, a Fourier transform lens 42, a quarter-wave plate 26, an objective lens 28, a Fourier transform lens 29, a mirror 30, a Fourier transform lens 31, and an image sensor 32. An objective lens unit 36 including the objective lens 28 and a mirror (not shown), the quarter-wave plate 26, and the Fourier transform lens 42 are secured to a tracking movable part 34. The mirror included in the objective lens unit 36 is for changing the direction of a light beam propagating from left to right in FIG. 1 to the direction perpendicular to the plane of FIG. 1.

A movable mirror actuator (not shown) included in a movable mirror unit 16 illustrated as part of the mechanical section in FIG. 1 controls the angle of rotation of the movable mirror 16a. Thus, a light beam passing through the objective lens 28 and applied to the hologram recording medium 48 is moved in a tangential direction of the hologram recording medium 48. The tracking movable part 34 is configured to slightly move the Fourier transform lens 42, the quarter-wave plate 26, and the objective lens unit 36 together in the radial direction of the hologram recording medium 48. The tracking movable part 34 is moved by a movable part actuator 60 serving as part of the mechanical section. That is, the movable mirror actuator included in the movable mirror unit 16 serves as part of the mechanical section and moves a light spot in the tangential direction of the hologram recording medium 48, while the tracking movable part 34 also serves as part of the mechanical section and moves a light spot in the tracking direction of the hologram recording medium 48.

Other components serving as part of the mechanical section and illustrated in FIG. 1 include a component that rotates the hologram recording medium 48 and a component that performs focus servo control. The hologram recording medium 48 is mounted on a turntable by magnet chucking or the like, and the turntable is secured to a rotational shaft of a spindle motor 33. With this structure of the mechanical section, the hologram recording medium 48 is rotated by a driving force of the spindle motor 33. A focus actuator 55 is mounted between the spindle motor 33 and a spindle motor base 58. The focus actuator 55 can vary the distance between the hologram recording medium 48 and the spindle motor base 58 in the direction perpendicular to the plane of FIG. 1 (i.e., in the focus direction). A first gear 57a secured to and rotating with a rotational shaft of a slide feed motor 56 is engaged with a second gear 57b secured to the spindle motor base 58. Thus, rotation of the slide feed motor 56 causes the entire hologram recording medium 48 to rotate about the center of concentric circles. With this slide feeding mechanism, the hologram recording medium 48 can be moved over a distance corresponding to the radius of the hologram recording medium 48, in response to a large amount of displacement of a low-frequency component of a tracking servo signal.

The hologram recording/reconstructing apparatus 1 further includes a temperature detector 70 that detects a temperature of the hologram recording medium 48. The temperature detector 70 uses a thermocouple thermometer, a holography temperature detector, a mercury thermometer, or the like to convert a temperature of the hologram recording medium 48 or a temperature near the hologram recording medium 48 into an electrical signal and detects it. The temperature converted into an electrical signal and detected as a temperature signal is input to the controller 100.

(Overview of Recording Operation)

Along with the operation of each part of the optical section, how data is recorded as a hologram will now be described.

The laser source 10 has, for example, a laser (so-called blue laser) that emits a laser beam having a wavelength of 405 nm. The laser source 10 causes a light beam from the blue laser to pass through an external resonator, so that the wavelength of the light beam can be varied. When light reflected off a lens or the like returns, the isolator 11 prevents the light from returning to the blue laser constituting an external resonator laser, thereby maintaining oscillation in single mode. The wavelength of the laser beam is controlled by a signal from the controller 100.

The shutter 12 is a device that permits or blocks transmission of the light beam. According to a signal from the controller 100, the shutter 12 controls whether to allow the light beam to pass through. The Fourier transform lens 13 and the Fourier transform lens 14 are for increasing the diameter of the light beam. The light beam with this increased diameter enters the movable mirror 16a and is reflected to the polarization beam splitter 20. Then, the light beam is directed by the polarization beam splitter 20 toward the spatial modulator 19. Thus, the light beam can illuminate a desired area in the spatial modulator 19. That is, the light beam can illuminate a reference beam region 19a and a signal beam region 19b (see FIG. 3) in the spatial modulator 19 described below.

The spatial modulator 19 displays predetermined patterns in the reference beam region 19a and the signal beam region 19b. Thus, the spatial modulator 19 spatially modulates the light beam to obtain the reference beam and the signal beam. For example, a reflective ferroelectric liquid crystal display is used as the spatial modulator 19. The reflective ferroelectric liquid crystal display is formed as a two-dimensional array of very small pixels each being, for example, 10 µm square. The spatial modulator 19 contains a 1000 by 1000 matrix of pixels, that is, the total number of pixels arranged in the spatial modulator 19 is 1000000. These pixels form the reference beam region 19a, the signal beam region 19b, and further, a reconstruction beam region. Each of the predetermined patterns described above is a combination of pixels, for each of which it is determined whether to reflect the light beam applied thereto. The modes of these predetermined patterns are controlled by the controller 100.

Figure 2:
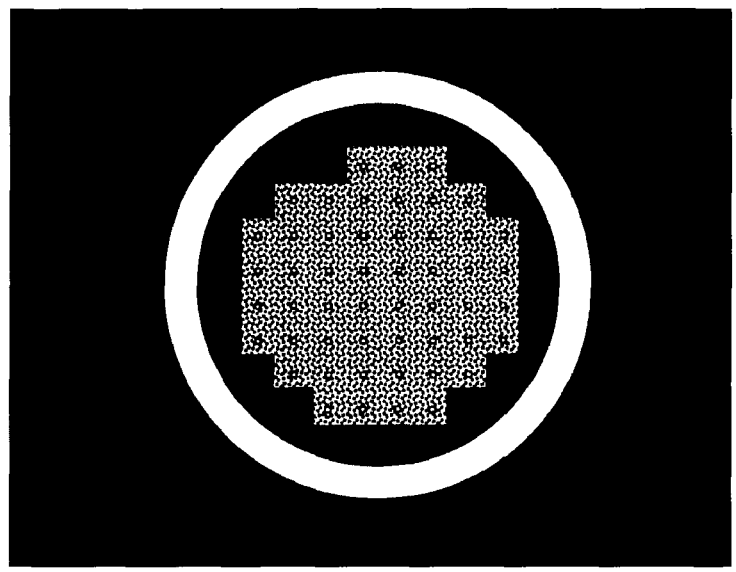
FIG. 2 illustrates patterns displayed in a reference beam region and a signal beam region.

FIG. 2 illustrates patterns displayed in the reference beam region 19a and the signal beam region 19b. In FIG. 2, portions having the same color as that of the background of the drawing (hereinafter referred to as white portions) reflect the light beam, while portions shown in black (hereinafter referred to as black portions) do not reflect the light beam. The controller 100 encodes data to be recorded into binary block codes and assigns "1" to each of the white portions and "0" to each of the black portions. An internal polygonal part corresponds to the signal beam region 19b for generating a signal beam, while a light doughnut-shaped part corresponds to the reference beam region 19a for generating a reference beam. For example, the polygonal part and the doughnut-shaped part may be formed by randomly arranging both white and black portions as illustrated in FIG. 2, or may be formed by arranging white portions only. The signal beam and the reference beam are separated by a black area between the polygonal part and the doughnut-shaped part.

Figure 3:
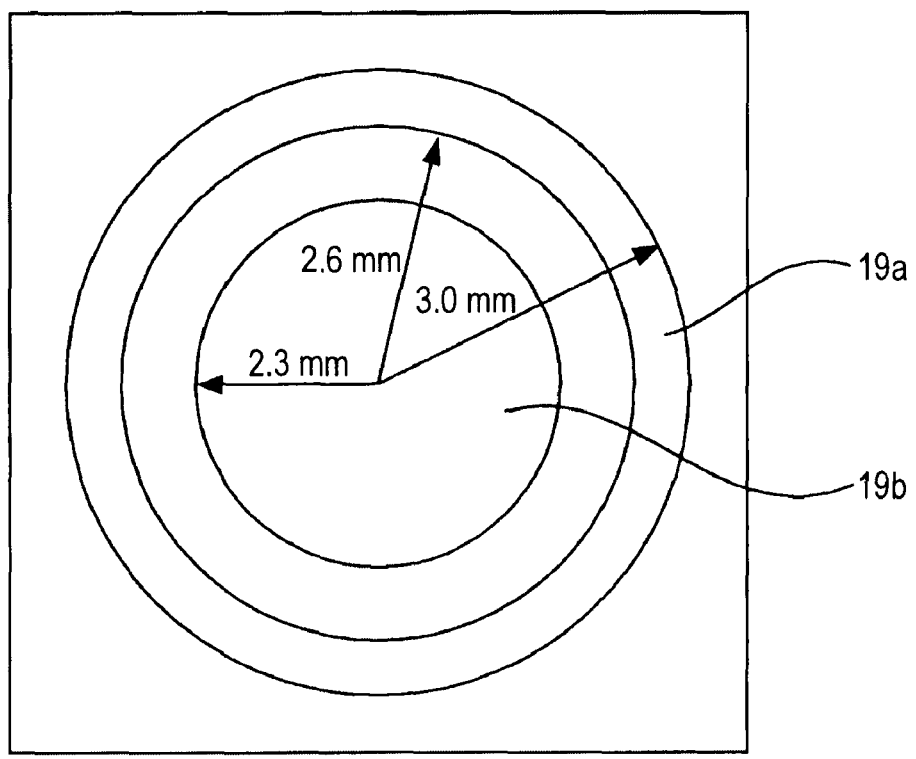
FIG. 3 illustrates the reference beam region and signal beam region of FIG. 2 with specific dimensions.

FIG. 3 illustrates ranges of the reference beam region 19a and signal beam region 19b of FIG. 2 with specific dimensions.

Referring back to FIG. 1, each part illustrated therein will be described. The directions of polarization of the reference beam and signal beam modulated by the spatial modulator 19 are orthogonal to the incident light beam with a phase difference of π/2. Therefore, the reference beam and the signal beam are transmitted through the polarization beam splitter 20 and propagate toward the Fourier transform lens 21. These light beams having passed through the Fourier transform lens 21 and the Fourier transform lens 24 are incident on the polarization beam splitter 27.

The polarization beam splitter 27 is configured to direct the reference beam and the signal beam to the Fourier transform lens 41 and direct a diffracted beam (described below) to the Fourier transform lens 29.

The light beams having passed through the Fourier transform lens 41 and the Fourier transform lens 42 are transmitted through the quarter-wave plate 26, redirected by the mirror in the objective lens unit 36, and converged by the objective lens 28. Then, a hologram corresponding to interference fringes formed by the reference beam and the signal beam is recorded in the recording material layer 48b of the hologram recording medium 48.

(Overview of Reconstructing Operation)

Along with the operation of each part of the optical section, how a hologram is reconstructed will now be briefly described.

Typically in the related art, during reconstruction of a hologram, the reference beam region 19a serves as a reconstruction beam region and displays the same pattern as that displayed during recording. The present embodiment is characterized in that the reconstruction beam region during reconstruction is different from the reference beam region 19a during recording. This feature of the present embodiment will be described in detail later. The pixels in the signal beam region 19b are all formed from black portions, and thus the signal beam region 19b does not reflect a light beam. The spatial modulator 19 displays the above-described pattern according to a signal supplied from the controller 100 to the spatial modulator 19.

After the pattern is displayed in the spatial modulator 19, a light beam is applied to the spatial modulator 19 as in the case of recording. The light beam modulated by the spatial modulator 19 passes through the optical components, as in the case of recording, and is converged by the objective lens 28 and eventually converged onto the recording material layer 48b of the hologram recording medium 48. A diffracted beam generated according to the hologram formed in the recording material layer 48b is reflected by the reflective film (not shown) of the hologram recording medium 48 and again passes through the objective lens 28, the quarter-wave plate 26, and the other optical components to reach the polarization beam splitter 27.

In the outward path, the quarter-wave plate 26 converts the polarization of a blue light beam from linear to circular polarization. In the backward path, if the polarization of the blue light beam incident on the quarter-wave plate 26 is circular polarization, the quarter-wave plate 26 converts the polarization of the blue light beam from circular to linear polarization. Since the plane of polarization of the returned blue light beam is orthogonal to that of the outward blue light beam with a phase difference of π/2, the diffracted beam having reached the polarization beam splitter 27 is directed toward the Fourier transform lens 29.

The mirror 30 reflects the diffracted beam from the Fourier transform lens 29 to guide it to the Fourier transform lens 31. The mirror 30 is provided to bend the optical path of the light beam to reduce the size of the optical section of the hologram recording/reconstructing apparatus 1. The Fourier transform lens 29 and the Fourier transform lens 31 are configured such that a real image obtained after scaling is formed on the image sensor 32. The image sensor 32 is an optical photodetector, such as a complementary metal-oxide-semiconductor (CMOS) sensor or a charge-coupled device (CCD), where a plurality of small light-receiving elements (pixels) are two-dimensionally arranged. The image sensor 32 detects an electrical signal corresponding to the intensity of the diffracted beam applied to each of the light-receiving element. The controller 100 is configured to input the electrical signals to perform signal processing for reconstruction of recorded data. As compared to CDs and DVDs of the related art, the hologram recording medium 48 is characterized in that 1×10³ to 1×10⁶ bits of data (i.e., a page of data) can be simultaneously recorded thereon or reconstructed therefrom.

(Effect of Thermal Expansion of Hologram Recording Medium)

Figure 4:
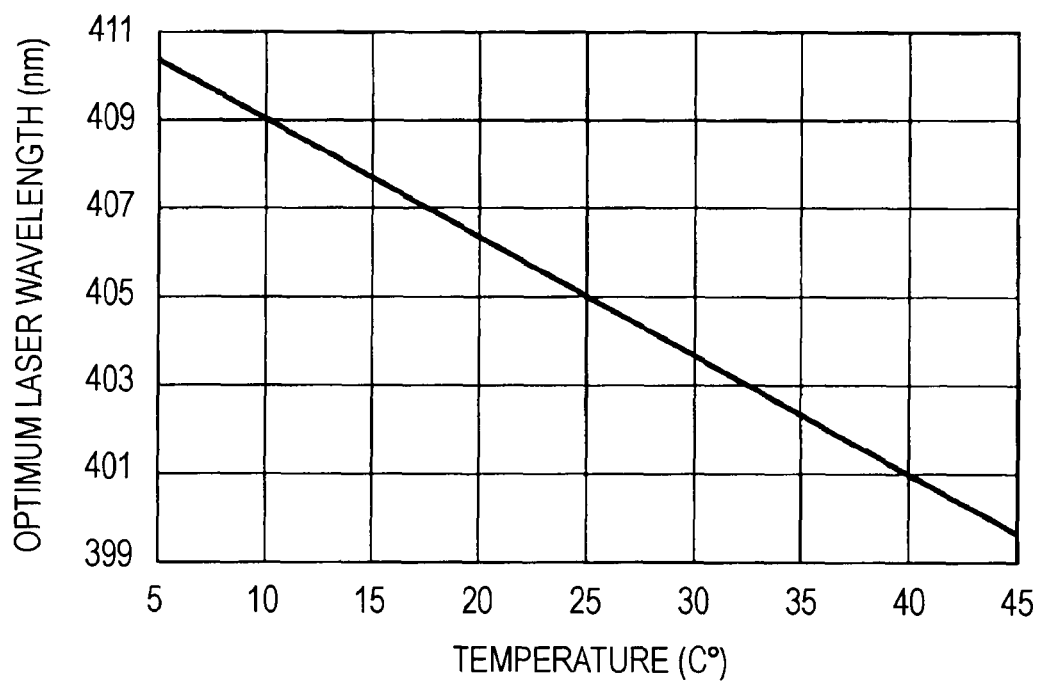
FIG. 4 is a graph showing a relationship between a temperature of a hologram recording medium and an optimum wavelength of a laser beam emitted from a laser source.
Figure 5:
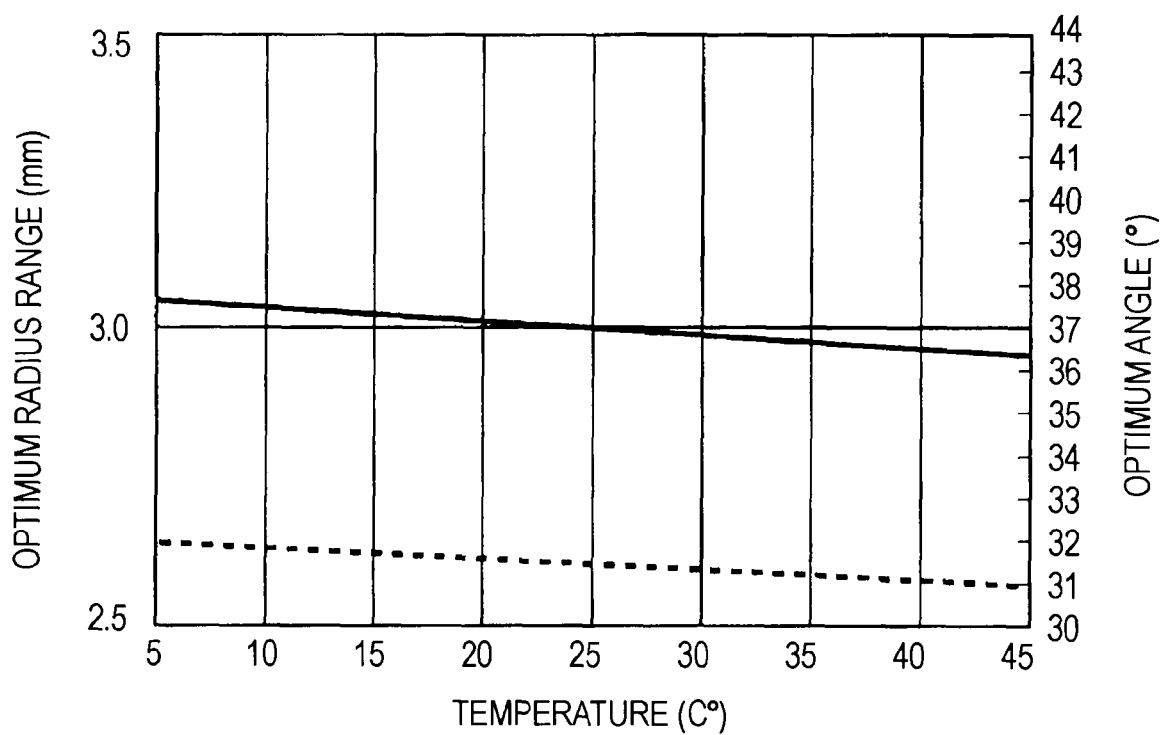
FIG. 5 is a graph showing a relationship of a temperature of the hologram recording medium, a range of an optimum incident angle of a light beam, and a range of an optimum radius.

FIG. 4 is a graph showing a relationship between a temperature of the hologram recording medium 48 and an optimum laser wavelength (light beam wavelength) that is an optimum wavelength of a laser beam (light beam) emitted from the laser source 10. FIG. 5 is a graph showing a relationship between a temperature of the hologram recording medium 48 and an incident angle range that is a range of an optimum incident angle of the reference and reconstruction beams (see FIG. 6 described below), and a relationship between a temperature of the hologram recording medium 48 and a reference beam region 19a1 (see FIG. 6 described below) and a reconstruction beam region 19a2 (see FIG. 7 described below). Although the graphs of FIG. 4 and FIG. 5 show results obtained by calculation, the degree of agreement of these calculation results with experimental results is very high. These calculation results were obtained by analyzing phenomena caused by differences in the degree of thermal expansion among the substrate 48a, the substrate 48c, and the recording material layer 48b of the hologram recording medium 48 discussed in Description of the Related Art with reference to FIG. 17.

The graphs of FIG. 4 and FIG. 5 show conditions under which most preferable reconstruction characteristics can be obtained. For example, when recording is performed under conditions where the temperature of the hologram recording medium 48 is 25° C., the incident angle of the reference beam is 31.3° to 36.9° (the reference beam region 19a1 extends from a radius of 2.6 mm to 3.0 mm), and the laser wavelength is 405 nm, if the temperature of the hologram recording medium 48 during reconstruction is also 25° C., it is most desirable that reconstruction be performed under conditions where the incident angle of the reconstruction beam is 31.30 to 36.9° (the reconstruction beam region 19a2 extends from a radius of 2.6 mm to 3.0 mm) and the laser wavelength is 405 nm. In another example, when recording is performed under the same conditions as those described above, if the temperature of the hologram recording medium 48 during reconstruction is 35° C., it is most desirable that reconstruction be performed under conditions where the incident angle of the reconstruction beam is 31.1° to 36.6° (the reconstruction beam region 19a2 extends from a radius of 2.58 mm to 2.98 mm) and the laser wavelength is 402.3 nm. In still another example, when recording is performed under the same conditions as those described above, if the temperature of the hologram recording medium 48 during reconstruction is 15° C., it is most desirable that reconstruction be performed under conditions where the incident angle of the reconstruction beam is 31.6° to 37.1° (the reconstruction beam region 19a2 extends from a radius of 2.62 mm to 3.02 mm) and the laser wavelength is 407.7 nm.

The graphs of FIG. 4 and FIG. 5 can also be used as follows. For example, when the temperature of the hologram recording medium 48 during recording is 35° C., it is most desirable that recording be performed under conditions where the incident angle of the reference beam is 31.1° to 36.6° (the reference beam region 19a1 extends from a radius of 2.58 mm to 2.98 mm) and the laser wavelength is 402.3 nm. If recording is performed under these conditions, the optimum laser wavelength and the optimum incident angle of the reconstruction beam (the optimum range of the reconstruction beam region 19a2) at any temperature of the hologram recording medium 48 during reconstruction can be determined by referring to the graphs of FIG. 4 and FIG. 5.

Data represented by the graphs of FIG. 4 and FIG. 5 is stored, for example, in a RAM in the controller 100. The controller 100 detects a temperature from the temperature detector 70, refers to the RAM to read the laser wavelength and incident angle of the reference beam or reconstruction beam (the range of the reference beam region 19a1 or reconstruction beam region 19a2) that correspond to the detected temperature, controls the spatial modulator 19, and thus can define optimum recording and/or reconstruction conditions.

First Embodiment

Figure 6:
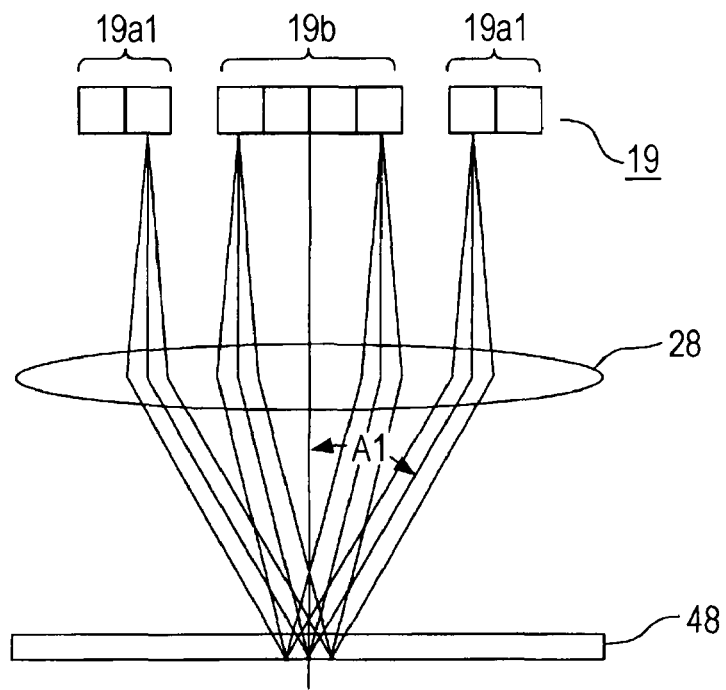
FIG. 6 is a schematic cross-sectional view illustrating a mutual relationship of the reference beam region and the signal beam region during recording, an objective lens, and the hologram recording medium, along the direction of propagation of a light beam.

A first embodiment of the present invention will be described in detail with reference to FIG. 6 to FIG. 8. FIG. 6 is a schematic cross-sectional view illustrating a mutual relationship of the reference beam region 19a1 and signal beam region 19b displayed in the spatial modulator 19 (see FIG. 1) during recording, the objective lens 28 (see FIG. 1), and the hologram recording medium 48 (see FIG. 1) along the direction of propagation of a light beam.

Figure 7:
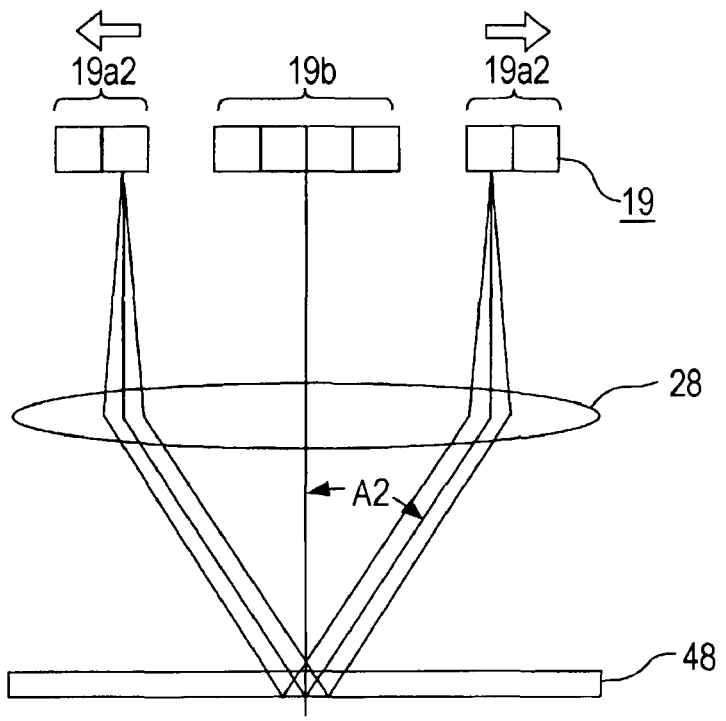
FIG. 7 is a schematic cross-sectional view illustrating a mutual relationship of a reconstruction beam region and the signal beam region during reconstruction, the objective lens, and the hologram recording medium, along the direction of propagation of a light beam.
Figure 8:
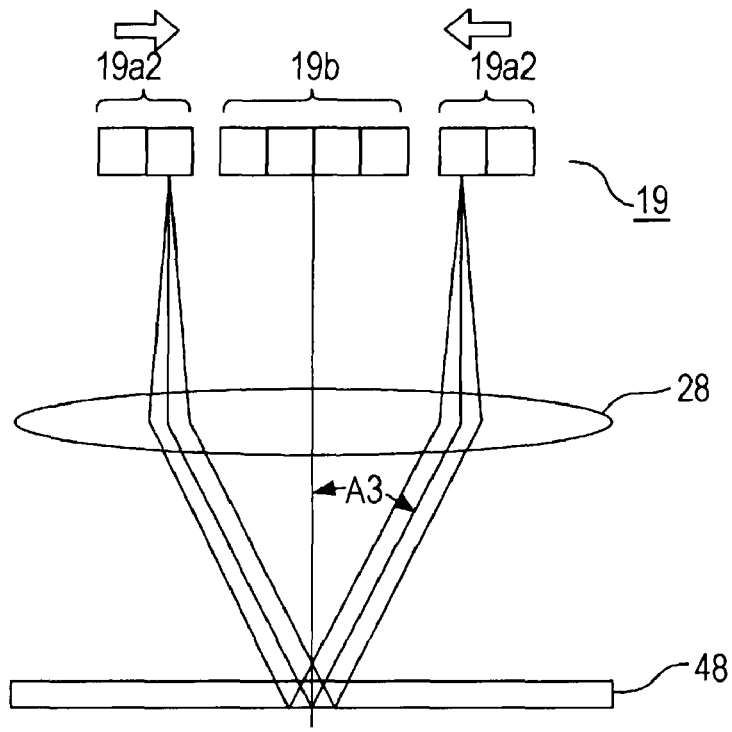
FIG. 8 is a schematic cross-sectional view illustrating a mutual relationship of the reconstruction beam region and the signal beam region during reconstruction, the objective lens, and the hologram recording medium, along the direction of propagation of a light beam.

FIG. 7 and FIG. 8 are schematic cross-sectional views each illustrating a mutual relationship of the reconstruction beam region 19a2 and signal beam region 19b displayed in the spatial modulator 19 during reconstruction, the objective lens 28, and the hologram recording medium 48 along the direction of propagation of a light beam.

More precisely, in FIG. 6 to FIG. 8, light is refracted on the surface of the hologram recording medium 48. However, since this does not affect the essence of the present invention, the illustration of the refraction of light is omitted in FIG. 6 to FIG. 8.

An incident angle A1 shown in FIG. 6 indicates an incident angle of a reference beam reflected from a specific pixel. Here, although a spatial position of this pixel may vary, a signal indicating a value of "1" or "0" for this pixel is determined. That is, this pixel is a predetermined and electrically defined pixel. Hereinafter, a position of such a pixel is referred to as an electrical position. An incident angle A2 shown in FIG. 7 and an incident angle A3 shown in FIG. 8 each indicate an incident angle of a reconstruction beam reflected from this specific pixel. A feature of the present embodiment is that a light beam with the incident angle A1, a light beam with the incident angle A2, and a light beam with the incident angle A3 pass through the same point on a hologram. In FIG. 6 to FIG. 8, a light beam reflected from the spatial modulator 19 is illustrated as if it is a point source emitted from a center of each pixel. However, in practice, light beams are reflected from the entire area of the reference beam region 19a1, the entire area of the reconstruction beam region 19a2, and the entire area of the signal beam region 19b and continuously distributed.

As illustrated in FIG. 6 (as in the case of FIG. 3), the reference beam region 19a1 is arranged in a radially outer part of the spatial modulator 19, while the signal beam region 19b is arranged in a radially inner part of the spatial modulator 19. The following will be described on the assumption that the temperature of the hologram recording medium 48 during recording is 25° C. A light beam reflected from each of the reference beam region 19a1 and the signal beam region 19b diverges to reach the objective lens 28, passes through the objective lens 28, and is formed into parallel beams to illuminate the hologram recording medium 48.

Parameters in the present embodiment are defined such that when a focal length of the objective lens 28 is 5 mm, a numerical aperture (N.A.) of the objective lens 28 is 0.6, each of the pixels forming the reference beam region 19a1 and the signal beam region 19b is 10 μm square, and a refractive index of the hologram recording medium 48 is 1.5, a distance between parallel beams from each pixel is 405 μm. In this calculation, refraction in the hologram recording medium 48 is taken into account. As shown in FIG. 3, the signal beam region 19b is set to be within a 2.3 mm radius of the spatial modulator 19 (regardless of the temperature), and the reference beam region is set to extend from a 2.6 mm radius to a 3.0 mm radius of the spatial modulator 19 when the temperature of the hologram recording medium 48 is 25° C. The ranges of the signal beam region and reference beam region can be set to any values according to an electrical signal output from the controller 100.

When recording is performed under the condition described above, if the temperature of the hologram recording medium 48 during reconstruction (where the signal beam region 19b is to be reconstructed as a dark portion) is different from that during recording by about 10° C., it is difficult, due to thermal expansion of the hologram recording medium 48, to reconstruct recorded data if the reference beam region 19a1 and the reconstruction beam region 19a2 coincide with each other, the incident angle of the reference beam and the incident angle of the reconstruction beam are both equal to the incident angle A1, and the wavelength of the reference beam and that of the reconstruction beam are the same. In consideration of this, the present embodiment is configured to independently define the reference beam region 19a1 and the reconstruction beam region 19a2. This includes the case where the reference beam region 19a1 and the reconstruction beam region 19a2 coincide with each other.

FIG. 7 illustrates the optimum reconstruction beam region 19a2 for reconstruction performed when, after recording is performed on the hologram recording medium 48 under the condition described above, the temperature of the hologram recording medium 48 is 15° C., which is 10° C. lower than that during recording. The reconstruction beam region 19a2 is defined by data (described with reference to FIG. 4 and FIG. 5) on which the principle of recording/reconstruction of the present embodiment is based. Here, the reconstruction beam region 19a2 is defined to extend from a 2.62 mm radius to a 3.02 mm radius of the spatial modulator 19. This is defined according to a command output from the controller 100 to the spatial modulator 19. Specifically, when each pixel is 10 μm square, the reconstruction beam region 19a2 is shifted outward by two pixels at both the inner and outer radii of the reconstruction beam region 19a2. The laser wavelength is set to 407.7 nm according to a command from the controller 100 to the laser source 10. The incident angle A2 is set to be greater than the incident angle A1.

FIG. 8 illustrates the optimum reconstruction beam region 19a2 for reconstruction performed when, after recording is performed on the hologram recording medium 48 under the condition described above, the temperature of the hologram recording medium 48 is 35° C., which is 10° C. higher than that during recording. The reconstruction beam region 19a2 is defined by data (described with reference to FIG. 4 and FIG. 5) on which the principle of recording/reconstruction of the present embodiment is based. Here, the reconstruction beam region 19a2 is defined to extend from a 2.58 mm radius to a 2.98 mm radius of the spatial modulator 19, while the laser length is defined to be 402.3 nm. This range of the reconstruction beam region 19a2 (corresponding to the incident angle of the reconstruction beam from 31.3° to 36.6°) is defined according to a command output from the controller 100 to the spatial modulator 19.

Specifically, when each pixel is 10 μm square, the reconstruction beam region 19a2 is shifted inward by two pixels at both the inner and outer radii of the reconstruction beam region 19a2. However, when each pixel is 10 μm square, it is generally difficult to illuminate the hologram recording medium 48 at the exact position of a desired radius. In this example, when the reconstruction beam region 19a2 is shifted by two pixels, the resulting inner radius is 2.58 mm. Therefore, in this case, the reconstruction beam region 19a2 is defined such that the inner radius thereof slightly exceeds the intended value. Thus, since the range of the incident angle necessary for reconstruction is covered, recorded data can be reconstructed without any problem. A light beam having a slightly excessive incident angle does not satisfy the Bragg condition, and thus does not adversely affect the reconstruction. The laser wavelength is set to 402.3 nm according to a command from the controller 100 to the laser source 10. The incident angle A3 is set to be smaller than the incident angle A1.

Figure 9:
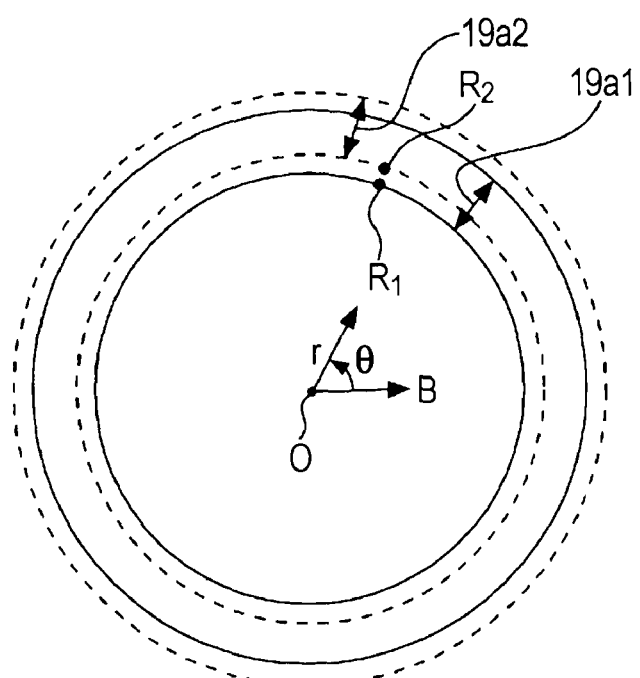
FIG. 9 illustrates the reference beam region and reconstruction beam region formed on a reflecting surface of a spatial modulator.
Figure 10:
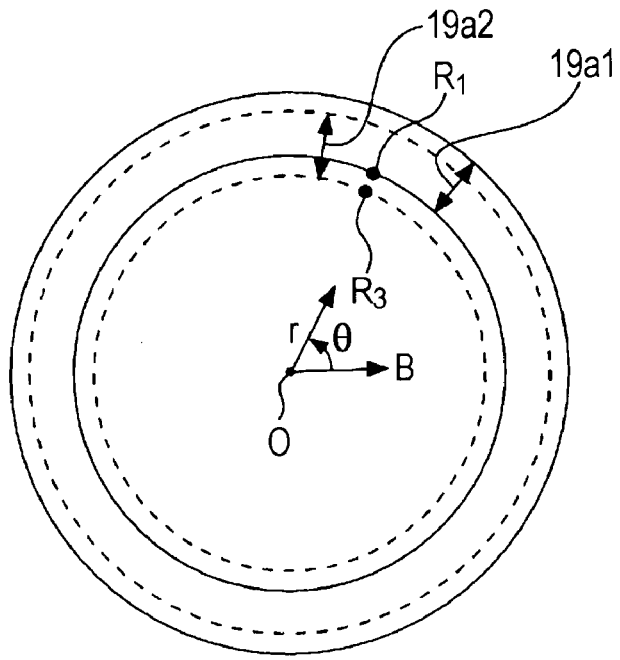
FIG. 10 illustrates the reference beam region and reconstruction beam region formed on the reflecting surface of the spatial modulator.

FIG. 9 and FIG. 10 each illustrate the reference beam region 19a1 and reconstruction beam region 19a2 formed on the reflecting surface of the spatial modulator 19. FIG. 9 corresponds to the cross-sectional view of FIG. 7, while the FIG. 10 corresponds to the cross-sectional view of FIG. 8.

In FIG. 7, the reference beam region 19a1 is located radially inside the reconstruction beam region 19a2. In this case, in FIG. 9, when spatial positions of the pixels belonging to the reference beam region 19a1 and the reconstruction beam region 19a2 are expressed in cylindrical coordinates, a point in the reference beam region 19a1 can be expressed as a point $R_1$ (which is 10 μm square in practice). According to the electrical position of this point, the controller 100 controls, with a signal of "0" or "1", whether this point is a white portion or a black portion. When reconstruction is performed at a temperature of 15° C., which is 10° C. lower than that during recording, the point $R_1$ in the reference beam region 19a1 is spatially mapped to a point $R_2$ in the reconstruction beam region 19a2, the point $R_2$ having the same electrical position as that of the point $R_1$. In other words, a spatial position $(\theta_1, r_1)$ is mapped to a spatial position $(\theta_2, r_2)$. When the point $R_1$ and the point $R_2$ are expressed in cylindrical coordinates, $\theta_1$ is an angle of the point $R_1$ relative to a base line B, $r_1$ is a radius from a center O to the point $R_1$, and $r_2$ is a radius from the center O to the point $R_2$. Here, the points $R_1$ and $R_2$ having the same electrical position have the same angle $\theta_1$. According to the temperature of the hologram recording medium 48 during recording and that during reconstruction, the point $R_1$ having the radius $r_1$ is mapped to the point $R_2$ having the radius $r_2$ different from the radius $r_1$. For primary approximation, a transformation equation of Equation 1 below is established between the radius $r_1$ of the point $R_1$ and the radius $r_2$ of the point $R_2$.

$$r_2 = r_1 + k(Tr - Tw) \quad \text{Equation 1}$$

where k is a constant, Tw is a temperature during recording, and Tr is a temperature during reconstruction. Here, the temperature Tw is 25° C., while the temperature Tr is 15° C. At the same time, the angle of the point $R_1$ and the angle of the point $R_2$ are both $\theta_1$.

In FIG. 8, the reference beam region 19a1 is located radially outside the reconstruction beam region 19a2. In this case, when reconstruction is performed at a temperature of 35° C., which is 10° C. higher than that during recording, the point $R_1$ in the reference beam region 19a1 is spatially mapped to a point $R_3$ in the reconstruction beam region 19a2, the point $R_3$ having the same electrical position of that of the point $R_1$. In other words, the spatial position $(\theta_1, r_1)$ is mapped to a spatial position $(\theta_1, r_3)$. Here, $r_3$ is a radius from the center O to the point $R_3$ expressed in cylindrical coordinates. In Equation 1, by replacing $r_2$ with $r_3$, substituting 25° C. into Tw, and substituting 35° C. into Tw, the radius $r_3$ of the point $R_3$ to which the point $R_1$ is mapped can be obtained.

In the first embodiment described above, a pattern displayed in each of the reference beam region 19a1 and the reconstruction beam region 19a2 (i.e., mode of distribution of white and black portions corresponding to the pixels forming the reference beam region 19a1 and the reconstruction beam region 19a2) is not limited to a specific one, but may be any pattern (e.g., predetermined pattern, random pattern, or pattern formed by white portions only), as long as the relationship represented by Equation 1 is applicable to pixels having the same electrical position.

Also, in the first embodiment described above, when the spatial positional relationship between the reference beam region 19a1 and the reconstruction beam region 19a2 is changed according to the temperature of the hologram recording medium 48 during recording and that during reconstruction, the laser wavelength is changed at the same time. However, if a difference between temperatures of the hologram recording medium 48 during recording and reconstruction is small, recording/reconstruction characteristics can be substantially improved only by changing the spatial positional relationship between the reference beam region 19a1 and the signal beam region 19b, without changing the laser wavelength.

Second Embodiment

Figure 11:
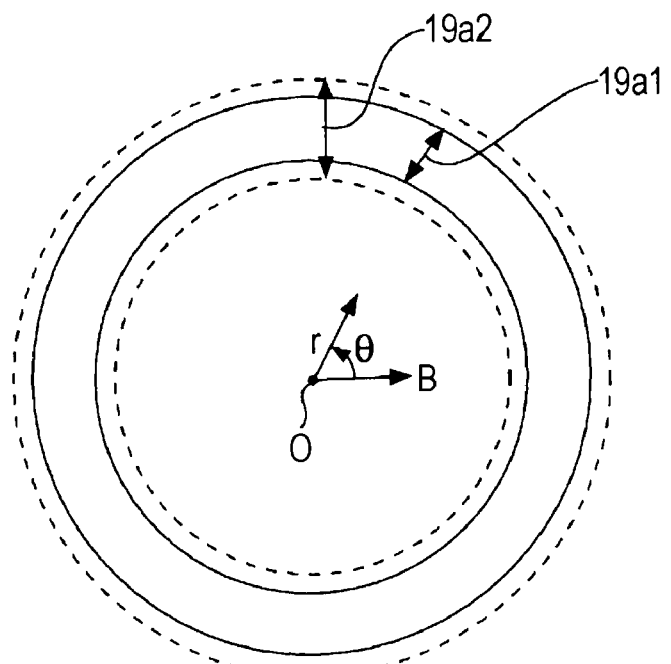
FIG. 11 illustrates the reference beam region and reconstruction beam region formed on the reflecting surface of the spatial modulator.

FIG. 11 illustrates the reference beam region 19a1 and reconstruction beam region 19a2 formed on the reflecting surface of the spatial modulator 19. A second embodiment of the present invention will now be described with reference to FIG. 11.

The hologram recording/reconstructing apparatus 1 is designed to operate at an operating temperature range of 5° C. to 45° C. Therefore, recording and reconstruction are performed when the temperature of the hologram recording medium 48 is in the 5° C. to 45° C. range, according to the operating temperature range of the hologram recording/reconstructing apparatus 1. Referring to FIG. 5, the reconstruction beam region 19a2 extends from a 2.56 mm radius to a 3.04 mm radius of the spatial modulator 19. In the second embodiment, regardless of the temperature of the hologram recording medium 48, the reconstruction beam region 19a2 extends from a 2.56 mm radius to a 3.04 mm radius of the spatial modulator 19, and then, the reconstruction beam over this entire region is applied to the hologram recording medium 48. On the other hand, the range of the reference beam region 19a1 is changed according to the temperature of the hologram recording medium 48. Thus, at any temperature in the operating temperature range of the hologram recording/reconstructing apparatus 1, a reconstruction beam component having a required incident direction is applied to the recording material layer 48b of the hologram recording medium 48 and good reconstruction can be achieved. The reconstruction is not affected even if an excess reconstruction beam is applied to the recording material layer 48b. This is because an excess reconstruction beam having an incident angle different from that originally intended does not satisfy the Bragg condition. Here, it is desirable that the reconstruction beam region 19a2 be entirely formed from white portions.

If a difference between temperatures of the hologram recording medium 48 during recording and reconstruction is relatively small, it is possible to achieve good recording/reconstruction characteristics even when a laser wavelength is held constant. However, if a difference between temperatures of the hologram recording medium 48 during recording and reconstruction is relatively large, the laser wavelength needs to be varied according to the graph of FIG. 4, so that more preferable recording/reconstruction characteristics can be achieved.

Alternatively, the ranges of the reference beam region 19a1 and reconstruction beam region 19a2 may be fixed regardless of the temperature of the hologram recording medium 48. This does not cause any problem with reconstruction characteristics, as long as the reconstruction beam region 19a2 is formed to cover, within an operating temperature range of a hologram reconstructing apparatus, an entire region from which a reference beam is to be applied to a hologram.

Third Embodiment

Figure 12:
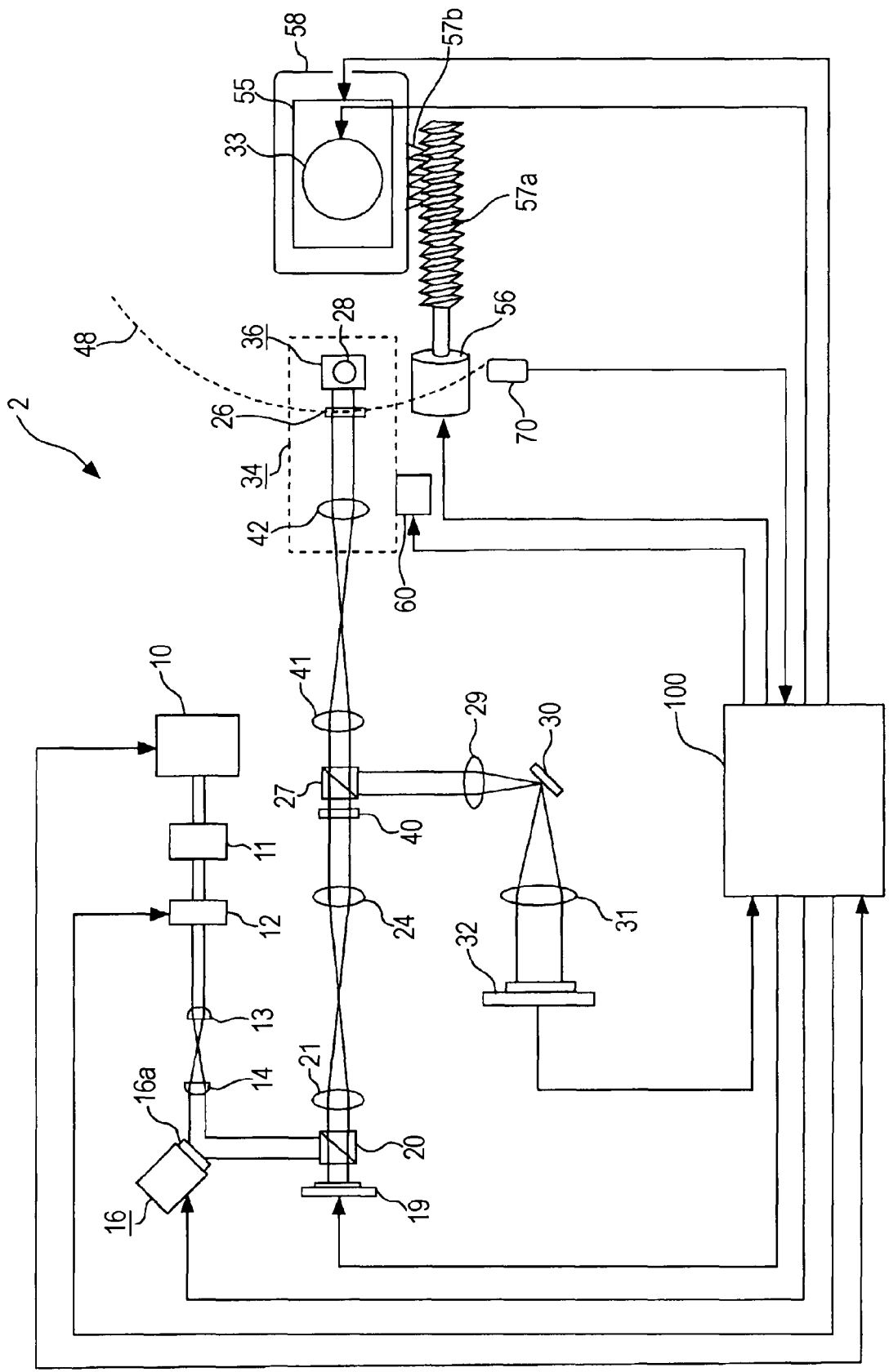
FIG. 12 is a schematic view primarily illustrating an optical section of a hologram recording/reconstructing apparatus according to another embodiment of the present invention.

FIG. 12 illustrates a hologram recording/reconstructing apparatus 2 according to a third embodiment of the present invention. By arranging a phase mask 40 at a position where a real image from the spatial modulator 19 is formed (see FIG. 12) or by arranging the phase mask 40 to be in contact with the spatial modulator 19, it is possible to prevent zero-order light from being generated in the recording material layer 48b (see FIG. 17). The zero-order light affects both recording and reconstruction in the following ways. That is, during recording, M numbers (M/#) are locally wasted and the number of times of multiple recording is reduced, while during reconstruction, since a light beam concentrates on a specific point in the recording material layer 48b, degradation of the recording material layer 48b is promoted. In the third embodiment, the phase mask 40 is used to shift the phase on a pixel-by-pixel basis such that the sum of amplitudes of light beams from the respective pixels becomes substantially zero (i.e., the amplitudes cancel each other out) at a position inside the recording material layer 48b and to which zero-order light is applied.

In the first embodiment, the ranges of the reference beam region 19a1 and reconstruction beam region 19a2 are changed. In the second embodiment, the range of the reference beam region 19a1 is changed, so that the incident angles of the reference beam and reconstruction beam are or the incident angle of the reference beam is radially changed. When a phase mask (e.g., phase mask 40) is added to either of the first and second embodiments described above, it is necessary to ensure that the phase during reconstruction is the same as that during recording, in order to achieve good reconstruction characteristics. Therefore, even when the ranges of the reference beam region 19a1 and reconstruction beam region 19a2 are changed, the phase generated by the phase mask during reconstruction needs to be the same as that during recording. Examples of such a phase mask include a radial phase mask.

FIG. 13 is a plan view of the phase mask 40 serving as an example of the radial phase mask. FIG. 13 illustrates a cross section of the phase mask 40, the cross section being taken along a line perpendicular to the direction of propagation of a light beam. The area extending from the inner radius to the outer radius of the phase mask 40 covers the whole area of the reference beam region and reconstruction beam region described in the first and second embodiments. For example, the inner radius of the phase mask 40 is 2.5 mm and the outer radius of the phase mask 40 is 3.1 mm. As illustrated in FIG. 13, convexes 40a and concaves 40b (see FIG. 14A) are arranged alternately and in a doughnut-shape. FIG. 14A to FIG. 14C are profiles of phase masks of various types. The shape of the phase mask 40 may be any of those illustrated in FIG. 14A to FIG. 14C. The phase mask illustrated in FIG. 14A has a rectangular profile. A level difference between a convex 40a and a concave 40b is $m\lambda/(2n)$, where m is an odd number, $\lambda$ is the wavelength of a light beam, and n is a refractive index. The phase mask illustrated in FIG. 14B has a sinusoidal profile. The phase mask illustrated in FIG. 14C has a trapezoidal profile.

Equation 2 is used to confirm by calculation that zero-order light can be cancelled by any of the phase masks described above.

$$E = \int_0^{2\pi} E_0 \exp[i(\varpi t + p\delta)] d\delta \qquad \text{Equation 2}$$
$$= E_0 \exp[i\varpi t] \int_0^{2\pi} \exp[ip\delta] d\delta$$
$$= \frac{E_0 \exp[i\omega t]}{ip} [\exp[ip\delta]]_0^{2\pi} = 0$$

where $2\pi$ is a phase difference between the top and bottom of the profile of any of the phase masks illustrated in FIG. 14A to FIG. 14C, p is an integer indicating the number of cycles of convex and concave portions per circumference of the phase mask.

The intensity $I_0$ of zero-order light is expressed by Equation 3 as follows:

$$I_0 = E^*E = 0 \qquad \text{Equation 3}$$

where E* is a conjugate function of E.

If a phase difference between the top and bottom of the profile of the phase mask is $2 \times 2\pi$ and there are p cycles per circumference of the phase mask, p in Equation 2 can be replaced with 2p, so that the same result is given.

Figure 15:
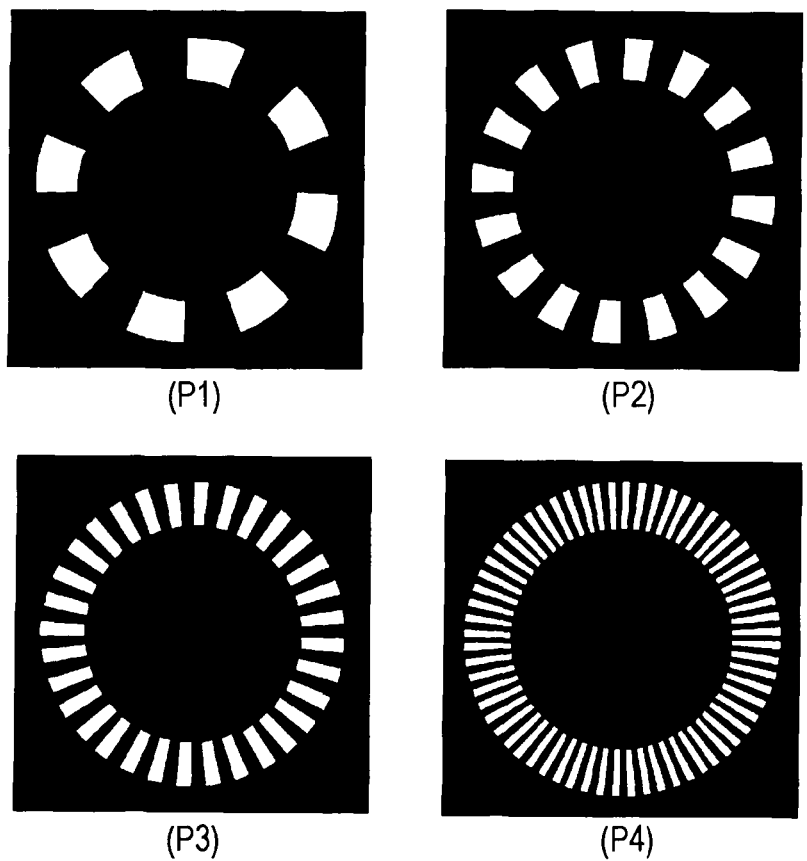
FIG. 15 illustrates phase masks with the different numbers of repetitions of convex and concave portions.

FIG. 15 illustrates phase masks with the different numbers of repetitions of convex and concave portions. In FIG. 15, a white portion corresponds to a convex and a black portion corresponds to a concave. FIG. 15 (P1) illustrates a phase mask having 16 partitions or 8 cycles of convex and concave portions per circumference. FIG. 15 (P2) illustrates a phase mask having 32 partitions or 16 cycles of convex and concave portions per circumference. FIG. 15 (P3) illustrates a phase mask having 64 partitions or 32 cycles of convex and concave portions per circumference. FIG. 15 (P4) illustrates a phase mask having 128 partitions or 64 cycles of convex and concave portions per circumference.

Figure 16:
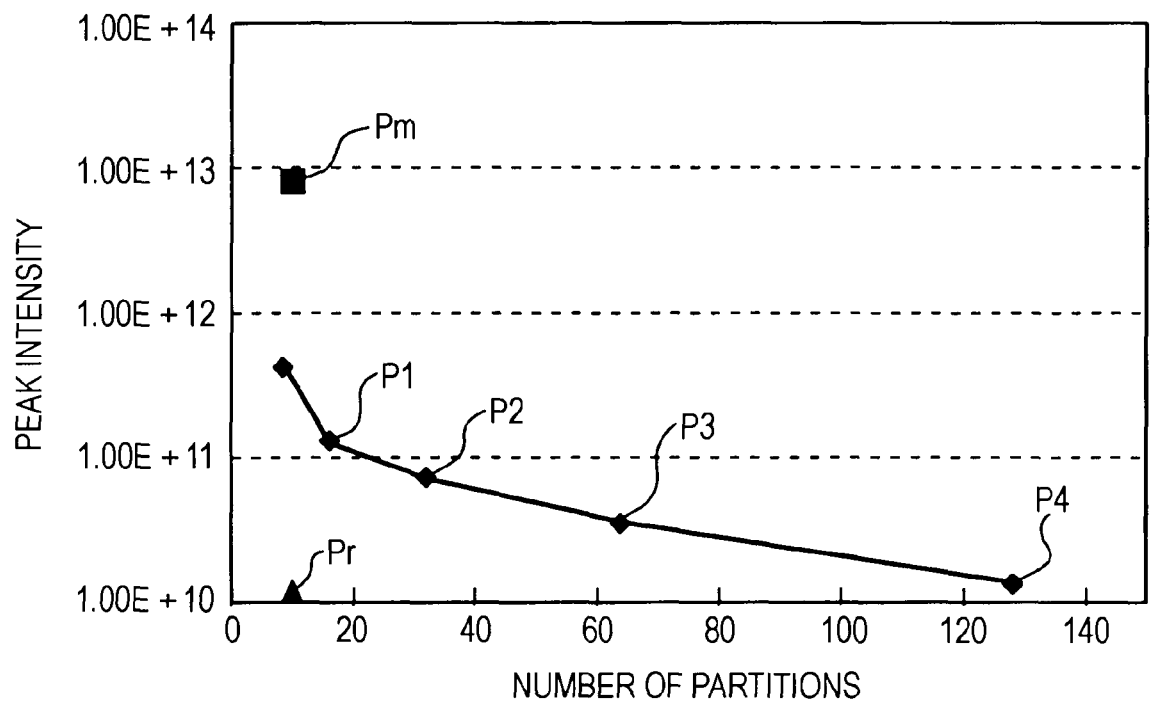
FIG. 16 is a graph showing a relationship between a peak intensity of a light beam in the hologram recording medium and the number of partitions in the phase mask.

FIG. 16 is a graph showing a relationship between the peak intensity of a light beam in the hologram recording medium 48 and the number of partitions in the phase mask, the number being twice the number of repetitions of convex and concave portions per circumference. The horizontal axis of the graph represents the number of partitions, while the vertical axis of the graph represents the peak intensity of a light beam, the peak intensity being highest among higher intensities appearing at one or a plurality of other points. Point P1 represents a peak intensity corresponding to the phase mask with 16 partitions, point P2 represents a peak intensity corresponding to the phase mask with 32 partitions, point P3 represents a peak intensity corresponding to the phase mask with 64 partitions, and point P4 represents a peak intensity corresponding to the phase mask with 128 partitions. Point Pm represents a peak intensity appearing when no phase mask is present. Point Pr represents a peak intensity appearing when a phase mask having two levels of random patterns is used. FIG. 16 shows that use of a phase mask has the effect of reducing the peak intensity. FIG. 16 also shows that the effect of reducing the peak intensity increases as the number of partitions in the phase mask increases.

The description relating to FIG. 14A to FIG. 14C and Equation 2 is based on the assumption that the phase mask has a regular pattern. However, in principle, the pattern of the phase mask does not have to be point-symmetric, but may be any pattern as long as the phase mask gives the same phase characteristics, where the ranges of the reference beam region and reconstruction beam region are changed, to light beams illuminating the same point on the hologram that changes its shape according to the temperature of the hologram recording medium 48. More specifically, when the reference beam region and the reconstruction beam region have a doughnut shape, the phase mask may have any pattern that can cancel zero-order light and is radial. The phase mask is in a one-to-one correspondence with the reference beam region and the reconstruction beam region. Even if the phase mask has a non-point-symmetric pattern, the controller 100 controls the mode of the phase mask, as in the case of the phase mask having a point-symmetric pattern described above.

In the spatial modulator 19 described above, pixels belonging to the signal beam region 19b, the reference beam region 19a1, and the reconstruction beam region 19a2 are 10 μm square. However, the pixels of the phase mask and the pixels of the spatial modulator 19 do not have to be identical in shape. For example, in the phase mask, pixels in an area corresponding to the signal beam region 19b may be 10 μm square, while pixels in an area corresponding to the reference beam region 19a1 and the reconstruction beam region 19a2 may be doughnut-shaped instead of square. Each doughnut-shaped pixel is formed to be about 10 μm in width (i.e., a difference between the radii of the outer and inner circles forming the doughnut-shape). Then, the modes of the reference beam region 19a1 and reconstruction beam region 19a2 formed by combining the plurality of doughnut-shaped pixels each having a width of 10 μm may be controlled by the controller 100 on a pixel-by-pixel basis.

As in the case of the first and second embodiments described above, the third embodiment has the effect of achieving good recording/reconstruction characteristics by appropriately defining the range of an incident angle of a light beam. Additionally, with the third embodiment, it is possible to prevent a light beam from concentrating on a specific point and thus to prevent an increase in peak intensity. Therefore, during recording, it is possible to prevent M numbers (M/#) from locally being wasted, and thus to increase the number of times of multiple recording. In addition, during reconstruction, it is possible to prevent a light beam from concentrating on a specific point in the recording material layer and thus to prevent degradation of the recording material layer.

The numerical values used in the description of the foregoing embodiments are typical values used in experiments by the present inventor listed in the present application and other persons involved. For example, if a hologram recording medium having a recording material layer different from the recording material layer 48b is used, the resulting graphs will be different from those of FIG. 4 and FIG. 5. Also, the radii of the signal beam region and reference beam region in the spatial modulator are not limited to those used in the foregoing description.

It should be understood by those skilled in the art that various modifications, combinations, sub-combinations and alterations may occur depending on design requirements and other factors insofar as they are within the scope of the appended claims or the equivalents thereof.

What is claimed is:

1. A hologram recording/reconstructing apparatus that illuminates a hologram recording medium with a signal beam and a reference beam to record data thereon as a hologram, illuminates the hologram recorded on the hologram recording medium with a reconstruction beam to obtain a diffracted beam, and reconstructs the recorded data from the diffracted beam, the hologram recording/reconstructing apparatus comprising:
   a spatial modulator in which a reference beam region for generating the reference beam and a reconstruction beam region for generating the reconstruction beam are formed; and
   a controller configured to control a range of the reference beam region and a range of the reconstruction beam region,
   wherein, according to a temperature of the hologram recording medium during recording, the range of the reference beam region is set to a first predetermined range and thereby a range of an incident angle of the reference beam on the hologram recording medium is set to a first predetermined angle range; and
   according to a temperature of the hologram recording medium during reconstruction of the recorded data, the range of the reconstruction beam region is set to a second predetermined range and thereby a range of an incident angle of the reconstruction beam on the hologram recording medium is set to a second predetermined angle range.

2. The hologram recording/reconstructing apparatus according to claim 1, wherein, according to a temperature of the hologram recording medium during recording, a wavelength of the reference beam is set to a first predetermined wavelength; and
   according to a temperature of the hologram recording medium during reconstruction of the recorded data, a wavelength of the reconstruction beam is set to a second predetermined wavelength.

3. The hologram recording/reconstructing apparatus according to claim 1, further comprising:
   a phase mask through which the reference beam and the reconstruction beam pass,
   wherein, when the range of the reference beam region and the range of the reconstruction beam region are changed, the phase mask gives the same phase characteristics to light beams illuminating the same point on the hologram.

4. The hologram recording/reconstructing apparatus according to claim 3, wherein the reference beam region and the reconstruction beam region are doughnut-shaped regions having the same center; and the phase mask is formed to have uniform phase characteristics along a radial line passing thorough a center thereof corresponding to the same center of the doughnut-shaped regions.

5. The hologram recording/reconstructing apparatus according to claim 1, wherein the controller includes a storage circuit configured to store information about the first predetermined region and the second predetermined region that correspond to temperatures of the hologram recording medium.

6. A hologram recording/reconstructing apparatus that illuminates a hologram recording medium with a signal beam and a reference beam to record data thereon as a hologram, illuminates the hologram recorded on the hologram recording medium with a reconstruction beam to obtain a diffracted beam, and reconstructs the recorded data from the diffracted beam, the hologram recording/reconstructing apparatus comprising:

a spatial modulator in which a reference beam region for generating the reference beam and a reconstruction beam region for generating the reconstruction beam are formed; and a controller configured to control a range of the reference beam region and a range of the reconstruction beam region, the range of the reference beam region is set to a predetermined range and thereby a range of an incident angle of the reference beam on the hologram recording medium is set to a predetermined angle range; and the range of the reconstruction beam region is set such that a range of an incident angle of the reconstruction beam includes the predetermined angle range of the reference beam during recording on the hologram recording medium.

7. A hologram recording apparatus that illuminates a hologram recording medium with a signal beam and a reference beam to record data thereon as a hologram, the hologram recording apparatus comprising:

a spatial modulator in which a reference beam region for generating the reference beam is formed; and a controller configured to control a range of the reference beam region, wherein, according to a temperature of the hologram recording medium during recording, the range of the reference beam region is set to a predetermined range and thereby a range of an incident angle of the reference beam on the hologram recording medium is set to a predetermined angle range.

8. A hologram reconstructing apparatus that illuminates, with a reconstruction beam, a hologram recording medium on which data is recorded as a hologram by illuminating the hologram recording medium with a signal beam and a reference beam having a first predetermined angle range corresponding to a temperature of the hologram recording medium during recording, obtains a diffracted beam, and reconstructs the recorded data from the diffracted beam, the hologram reconstructing apparatus comprising:

a spatial modulator in which a reconstruction beam region for generating the reconstruction beam is formed; and a controller configured to control a range of the reconstruction beam region, wherein, according to a temperature of the hologram recording medium during reconstruction of the recorded data, the range of the reconstruction beam region is set to a predetermined range and thereby a range of an incident angle of the reconstruction beam on the hologram recording medium is set to a second predetermined angle range.

9. A hologram reconstructing apparatus that illuminates, with a reconstruction beam, a hologram recording medium on which data is recorded as a hologram by illuminating the hologram recording medium with a signal beam and a reference beam, obtains a diffracted beam, and reconstructs the recorded data from the diffracted beam, the hologram reconstructing apparatus comprising:

a spatial modulator in which a reconstruction beam region for generating the reconstruction beam is formed; and a controller configured to control a range of the reconstruction beam region, wherein the range of the reconstruction beam region is set such that a range of an incident angle of the reconstruction beam includes a range of an incident angle of the reference beam during recording of the hologram on the hologram recording medium.

\* \* \* \* \*